(12) United States Patent
Wolff et al.

(10) Patent No.: US 7,323,427 B2
(45) Date of Patent: Jan. 29, 2008

(54) BORON ALUMINOSILICATE GLASS

(75) Inventors: Silke Wolff, Hueckeswagen (DE); Ute Woelfel, Mainz (DE); Uwe Kolberg, Mainz (DE); Holger Kasprzik, Mainz-Budenheim (DE)

(73) Assignee: Schott AG, Mainz (DE)

( * ) Notice: Subject to any disclaimer, the term of this patent is extended or adjusted under 35 U.S.C. 154(b) by 409 days.

(21) Appl. No.: 10/789,926

(22) Filed: Feb. 27, 2004

(65) Prior Publication Data

US 2004/0229743 A1 Nov. 18, 2004

(30) Foreign Application Priority Data

Mar. 12, 2003 (DE) ................. 103 11 802

(51) Int. Cl.
*C03C 3/093* (2006.01)
*C03C 4/00* (2006.01)

(52) U.S. Cl. ................ 501/67; 601/66; 601/903

(58) Field of Classification Search .......... 501/37, 501/38, 65–67, 79, 903
See application file for complete search history.

(56) References Cited

U.S. PATENT DOCUMENTS

| | | | |
|---|---|---|---|
| 3,365,315 A | 1/1968 | Beck et al. | |
| 4,106,946 A | 8/1978 | Ritze | |
| 4,264,131 A | 4/1981 | Sawamura et al. | |
| 4,520,115 A * | 5/1985 | Speit et al. | 501/60 |
| 5,744,409 A | 4/1998 | Hashimoto et al. | |
| 5,747,395 A * | 5/1998 | Smith et al. | 501/5 |
| 2004/0242397 A1* | 12/2004 | Nakayama | 501/64 |
| 2006/0142413 A1* | 6/2006 | Zimmer et al. | 523/122 |

FOREIGN PATENT DOCUMENTS

| | | |
|---|---|---|
| DE | 29 40 451 A1 | 4/1980 |
| DE | 283 281 A3 | 10/1990 |
| EP | 0 018 110 B1 | 10/1980 |
| EP | 0 081 928 B1 | 6/1983 |
| EP | 0 265 983 B1 | 5/1988 |
| EP | 0 399 577 A1 | 11/1990 |
| JP | 60-221338 | 11/1985 |
| JP | 63-8056 | 1/1988 |

\* cited by examiner

*Primary Examiner*—J. A. Lorengo
*Assistant Examiner*—Elizabeth A. Bolden
(74) *Attorney, Agent, or Firm*—Harness, Dickey & Pierce, P.L.C.

(57) ABSTRACT

A short optical glass is disclosed which is particularly suited for the applications imaging, projection, telecommunication, optical information technology and/or laser technology, also particularly suited for fiber applications (light guides or imaging guides). Preferably, the glass has a refractive index of $1.54 \leq n_d \leq 1.62$ and an Abbe coefficient of $48 \leq v_d = 57$. It further has good attenuating and ion exchange characteristics, good chemical stability and good crystallization stability. The glass comprises 35 to 50 wt.-% $SiO_2$, 0.1 to 6 wt.-% $B_2O_3$, 0.1 to 7 wt.-% $Al_2O_3$, 0.1 to 4 wt.-% $P_2O_5$, 4 to 24 wt.-% $R_2O$ (alkali oxides), 6 to 14.5 wt.-% BaO, 0 to 12 wt.-% other RO (alkaline earth oxides), 14 to 25 wt.-% ZnO, 0 to 5 wt.-% $La_2O_3$, 0 to 10 wt.-% $ZrO_2$, wherein $R_2O$ is an alkali oxide, RO is an alkaline earth oxide other than BaO, wherein $Li_2O$ is 6 wt.-% at the most, wherein the glass does not contain any $GeO_2$, SnO, $SnO_2$, AgO, $Sb_2O_3$ and, preferably, no rare earth oxides, and wherein the glass may be molten while adding suitable purifying agents.

21 Claims, No Drawings

BORON ALUMINOSILICATE GLASS

BACKGROUND OF THE INVENTION

The invention relates to a boron aluminosilicate glass for optical applications which in particular can be used advantageously as a core glass in optical fibers.

Prior art optical glasses having a refractive index between 1.54 and 1.62 (extra dense crown region and light barium flint region) usually contain PbO to reach the desired optical characteristics (refractive index of $1.54 \leq n_d \leq 1.62$ and an Abbe number of $48 \leq v_d \leq 57$) and a good transmission. Such glasses are of interest for numerous optical applications, e.g. for applications in imaging, projection, telecommunication, optical communication engineering and laser technology, however, in particular also for fiber applications (imaging fibers and/or light transmission fibers). Due to their lead content such glasses offer a low chemical resistance. Also often $As_2O_3$ is used as a refining agent. Since within the last years the glass component PbO and often also $As_2O_3$ have been regarded as environmentally problematic, the most manufacturers of optical instruments and products tend to use glasses free of lead and arsenic. For the application in products having a high degree of coating also materials of enhanced chemical stability (for undergoing the coating processes without damage) by keeping a high transmission (very low loss or attenuation) are gaining more and more importance.

For replacing lead in classical optical glasses, glasses containing large amounts of $TiO_2$ in a silicate matrix are known that lead to glasses being very instable with respect to crystallization, being difficultly meltable and hardly processable. In addition, the transmission of the glasses deteriorates (the loss increases) due to the intrinsic adsorption of $TiO_2$.

Also lately the development of "short" glasses has been desired due to processing aspects, i.e. glasses the viscosity of which is extremely temperature dependent. This behavior during processing offers the advantage that hot forming times, i.e. the times of mold closure, can be reduced. Thereby throughput can be enhanced on the one hand, and on the other hand it is easy on the mold material, this having a very positive effect on the total manufacturing cost. Also due to the fast cooling (shorter mold closure times) even glasses exhibiting an enhanced crystallization tendency can be processed when compared with longer glasses, and an initial nucleation which would be problematic during subsequent secondary heat-forming steps (fiber drawing, ion-exchange, subsequent pressing, reforming, fine cooling, etc.) is avoided.

For micro-structuring purposes (gradient-index lenses, (flat, rod shaped fiber (bundle)-like) light guides, spherical lenses etc.) using ion-exchange (e.g. (Na—Ag)) the novel materials should also be ion-exchangeable on an economical basis in standard processes. An additional characteristic may be the tension building ion-exchangeability (e.g. Na—K, "pretensioning").

Optical materials for general applications should also be applicable in fiber applications, e.g. as fiber core glasses. To this end, novel types of glasses must particularly be tolerant against secondary heat-forming steps (fiber drawing, melting together, etc.) and must have a good compatibility with conventional fiber cladding glasses.

Commonly, a glass fiber for the transmission of light comprises a highly refractive core glass and a cladding glass enclosing the core glass and having a lower refractive index than the core glass. Under suitable conditions, stepped-index fibers comprising a core glass and a cladding glass completely enclosing the core glass at its outer peripheral wall can be produced. A light transmissive glass body of fiber shape within which the core glass offers a constant refractive index across the total cross surface is referred to as a stepped-index fiber. Glass fibers of this type transmit light, being introduced at one end of the fiber into the core, to the other end of the fiber, wherein the light is completely reflected at the interface between the core glass and the cladding glass (total reflection).

The amount of light that can be coupled into and transmitted within such a fiber is proportional to the square of the numerical aperture (NA) of the fiber and to the cross-sectional area of the fiber core. For transmitting large light amounts via long or middle distances ($\leq 100$ meters), such stepped-index fibers are often packed together to dense fiber bundles, are equipped with a protecting hose, are bonded with their ends to metal shells, and the front surfaces are processed to yield optically flat surfaces by grinding and polishing. Suitably fabricated optical fiber bundles are referred to as fiber optical light guides. In case a production process is used which allows for a geometric arrangement of individual fibers, in this way image light guides can be produced.

The higher NA of the individual fibers within the bundle, the larger amounts of light can be transmitted by these light guides.

Fiber optical light guides are used in various technical and medical applications (general industrial processes, illumination, traffic, automobile, architecture, endoscopy, dental medicine). Their most important function is the transmission of a light stream as large as possible from a place A to another place B, normally via short or middle distances (a few to 100 meters maximum). Herein often light emerging from a high power light source, such as a halogen or discharge lamp, is coupled into the fiber bundle by means of optical aids, such as a lens or a reflector.

The light amount transmitted by fiber optical light guides depends, apart from NA of its fibers, also from the transmissive characteristics of the core glasses contained therein. Only core glasses of very specific compositions having very low contaminations in the raw materials, from which they are molten, transmit the light with low attenuation along the total length of the light transmitter. The raw materials for melting such core glasses are relatively expensive due to the high purity required which may lead to considerable manufacturing costs for such fibers or for such light guides made thereof.

Apart from the amount of light transmitted by a fiber optical light guide, also a color true transmission of the light is of importance in many cases. Due to the spectral transmissive dependence of the core glass which is contained in the fibers, there may be a color deviation in the color position of the feeding light source, which may have a higher or lower degree, this often leading to a yellow color cast of the light emerging from the light guide. This is always detrimental when a color neutral representation is required (e.g. in the medical endoscopy with photographical image documentation for differentiating between healthy and malignant tissue etc.). The manufacture of optical stepped-index fibers from multi-component glasses is performed either in the so-called double-mold process or in the rod-tube process. In both cases, the core and cladding glasses are heated up to temperatures which correspond to a viscosity range between $10^4$ and $10^3$ dPas, and are drawn to fibers. To allow a manufacture of a stable fiber with low loss, the core and cladding glasses must be compatible to each other with respect to a variety of characteristics, such as the course of viscosity, the thermal expansion, the crystallization tendency, etc. In particular, there may be no contact reaction or crystallization, respectively, at the interface between the fiber core and cladding which would considerably impair a total reflection of the light introduced into the fiber core and which would render the fiber unsuitable for an application for low-loss light transmission. In addition, also the mechanical stability of the fiber would be negatively influenced by crystallization.

From U.S. Pat. No. 5,744,409 an optical borosilicate glass for precision pressed parts is known that is a material suitable for high borate amounts (up to a maximum of 30 wt.-%). In addition the glass contains a high amount of lithium oxide (7 to 12 wt.-%.

The high boron content leads to an extension of the viscosity which is detrimental with respect to processing. Also the chemical stability is impaired by a higher component mobility leading to lower crystallization stability and worse ion-exchange characteristics. The high lithium content in combination with a high borate content leads to an increased corrosion attack against the melting end wall material, this leading to increased production cost. If melting is performed in platinum, then the platinum input is increased and thus the transmissivity is deteriorated (not acceptable bad attenuation values). In case melting is performed within refractory material or within silica, then the crystallization stability is deteriorated by the material input (inner pre-nucleation).

From DD 283 281 A3 an irradiation resistant UV-transmissive optical filter glass free of cerium is known that comprises germanate and/or tin oxide and/or antimonic oxide as mandatory components. Here these components serve to stabilize the material against irradiation damages during long-term use. The protective effect thus is based on a masking of the UV-absorption line initiating the damaging. For this purpose, in fact only very small amounts, i.e. doping amounts of the relevant material, are sufficient. However, exactly these characteristics of the afore-mentioned glasses render these not suitable for the applications mentioned at the outline, in particular not suitable as fiber optical material which must have a particularly low attenuation throughout the total spectral region.

From JP 88 008 056 an acid resistant, hydrolytically stable, optical and ophthalmic glass is known that comprises particularly high amounts of network formers in a certain ratio so that a borosilicate glass high on boron having optional amounts of $Al_2O_3$ results. The material disclosed herein may in this way contain up to 18 wt.-% $B_2O_3$. Such a high borate content must be seen as disadvantageous, since this leads to a strong extension of the viscosity. Also the chemical stability as well as the ion-exchange characteristics are impaired by the higher component mobility. Also negative is the fact that apart from a very high amount of CaO (7 to 30 wt.-%) a mandatory addition of $TiO_2+Nb_2O_5$ of 10 to 21 wt.-% in total is necessary. Such a high amount of CaO (network modifier) leads to a strong expansion of the stabilizing network and thus to strong crystallization tendencies and low chemical resistance of the glasses. Also, there is a high potential for the generation of diffusion impeding layers in the initial phase of a potential ion-exchange, this impeding an economical and suitable exchange with respect to this application. The addition of $TiO_2+Nb_2O_5$ in total leads to an extremely strong decrease in transmission at the blue spectral edge, since both components have strong self-absorptions. Also, they decrease the crystallization stability of the material due to their nucleating characteristics.

From U.S. Pat. No. 3,365,315 a process for the manufacture of hollow glass parts having a certain density is known. The glass that is used comprises a very high amount of $SiO_2$ (60 to 80 wt.-%). Alkali oxides and alkaline earth oxides are added only in such small amounts that a suitable short glass cannot be reached.

JP 85 221 338 A (patent abstracts of Japan 60 221 338A) discloses an optical oxy-halogenated glass having a refractive index in the range between 1.62 and 1.85. Herein mandatory amounts of at least 1 wt.-% $La_2O_3$ and of at least 0.1 wt.-% $Y_2O_3$ are necessary to obtain the optical position. Thereby, the attenuation characteristics of the material are deteriorated by intrinsic absorption and also the glass is made more expensive.

From EP 0 265 983 B1 a luminescent silica glass is known that comprises only a small amount (0 to 0.15 moles of $Al_2O_3$, $B_2O_5$, $P_2O_5$, $ZrO_2$, $Sc_2O_3$, $Y_2O_3$, $La_2O_3$, $Gd_2O_3$, ZnO per mole of $SiO_2$). In addition, the glass comprises $Tb_2O_3$ and/or $Ce_2O_3$ as a luminescence activator.

With such a high $SiO_2$-content and only small additions of fluxing agents or network modifiers, respectively, the desired viscosity profile cannot be reached. Also the added activators are detrimental for the desired application, in particular for fiber applications.

From EP 0 399 577 A1 a high energy irradiation sensitive glass is known that is resistant against actinide irradiation. However, the glass comprises silver ions as well as photo-sensivity inhibitors, this being contradictory to the preferred applications, in particular to fiber applications.

For the manufacture of stepped-index fibers basically three fiber systems are known in the prior art.

The fiber system which is probably the best-known and most common one comprises a core glass of high lead content (commonly 35 wt.-% PbO and an alkali borosilicate glass as a cladding glass. The advantage rests in the high numerical aperture that can be reached (up to more than 0.7 with PbO contents of >50% in the core glass) together with low manufacturing costs and a good capability of drawing to fibers without crystallization problems. This, however, is in contrast to drawbacks such as a mediocre or bad attenuation (200 to 300 dB/km) as well as a somewhat high color cast, mainly caused by Pb self absorption (blue edge of the visible spectral range), as well as dragged-in contaminations of elements highly blue coloring, such as chromium and nickel. Also lead as an environmentally polluting material has come into disrepute more and more and hence is applied for fibers only in specific applications or not at all any more.

A second fiber system comprises an alkali borosilicate glass which is applied as a core as well as a cladding glass.

In the prior art several such glass systems are described, e.g. within EP 0 018 110 B1 or in EP 0 081 928 B1 or in DE 29 40 451 A1 or in U.S. Pat. No. 4,264,131. Partially these glasses, apart from a high boron content, also contain high amounts of alkaline earth and/or zirconium and germanium oxide to reach the desired high refractive index. The advantage rests in the very low attenuation (partially around 10 dB/km) and in their low color cast together with normally environmentally friendly raw materials. A disadvantage of these glasses rests in the commonly lower numerical aperture of the fibers as well as in a lower chemical stability. Also the mandatory boron oxide amount (U.S. Pat. No. 4,264, 131, EP 0 081 928 B1, DE 29 40 451 A) is detrimental with respect to the refractory material stability. Due to the lower chemical stability the fibers, during their manufacture, directly after drawing, e.g. from a drawing die at the double mold, must be supplied online with a plastic coating protection against possible chemical and/or mechanical attack. In addition, the low attenuation is achieved only by utilizing highly pure and thereby very expensive raw materials. The two last mentioned aspects, high manufacturing cost and a mandatory plastic coating, thus render practically impossible an application as fiber bundles for broader applications. By contrast, they are used as single fibers for data or energy transfer (laser fiber) in a variety of special applications.

Also fibers on pure $Si_2O$-basis basically are possible as a third fiber system for fiber bundles for the transmission of light. Their advantages resting in an extremely low attenuation (up to 6 dB/km) in a good color neutrality and good environmental compatibility, are in contrast in particular to the high cost. Pure silica glass is extremely expensive due to its high processing temperature. In addition, there is a complicated doping process of the so-called preform according to which by the introduction of fluorine into the surface of a cylindrical rod the necessary reduction in refractory index of the pure quartz is reached that is necessary as an optical isolation to achieve light transfer in the later fiber. Also the numerical aperture of quartz fibers that can be reached is somewhat limited (0.22).

SUMMARY OF THE INVENTION

Therefore, it is a first object of the current invention to disclose an optical glass of high quality having a refractive index in the range between 1.54 and 1.62 and an Abbe number between 48 and 57.

It is a second object of the current invention to disclose an optical glass having an increased chemical stability.

It is a third object of the current invention to disclose an optical glass having a low loss or attenuation.

It is a fourth object of the current invention to disclose an optical glass having a good tolerance for secondary heat shaping steps and exhibiting good crystallization stability.

It is a fifth object of the current invention to disclose an optical glass suitable as a fiber core glass, preferably being compatible with common fiber optical cladding glasses.

It is a sixth object of the current invention to disclose an optical glass suitable as a fiber core glass in a stepped-index fiber.

These and other objects of the invention are achieved by a glass comprising (in wt.-%):

| | |
|---|---|
| $SiO_2$ | 35 to 50 |
| $B_2O_3$ | 0.1 to 7 |
| $Al_2O_3$ | 0.1 to 7 |
| $P_2O_5$ | 0.1 to 4 |
| $R_2O$ | 4 to 24 |
| RO | 0 to 12 |
| BaO | 6 to 14.5 |
| ZnO | 14 to 25 |
| $La_2O_3$ | 0 to 5 |
| $ZrO_2$ | 0 to 10, | wherein $R_2O$ is an alkali oxide, RO is an alkaline earth oxide apart from BaO, wherein the amount of $Li_2O$ is 6 wt.-% maximum, wherein the glass, apart from any unintended contaminants, does not contain any $GeO_2$, SnO, $SnO_2$, $Sb_2O_3$, AgO or any rare earth metals, and wherein the glass may be molten by adding refining agents in common amounts of preferably up to 1 wt.-%.

The glasses according to the invention are suitable as optical glasses for various applications, such as imaging, projection, telecommunication, optical communication, engineering, and/or laser technology, in particular also for fiber applications (image fibers and/or light transmitting fibers) having a refractory index of $1.54 \leq n_d \leq 1.62$, an Abbe number of $48 \leq v_d \leq 57$ and a very good transmission (low loss or attenuation). The glasses according to the invention can be easily molten and processed and offer a good chemical stability. In addition, the glasses according to the invention offer good ion-exchange characteristics and sufficient crystallization stability allowing an initial processing and secondary heat-forming steps (fiber drawing, ion-exchange, reshaping, fine cooling, final pressing) within continuous processes. The glasses according to the invention offer a good crystallization stability and a short viscosity-temperature profile whereby a thermal treatment (fiber drawing, ion-exchange, reshaping, fine cooling, final pressing) of the glasses is made possible without any problem.

The glasses according to the invention show a good environmental compatibility since they contain no lead and can be manufactured relatively cost effective, since the addition of expensive components is avoided. Since the glasses according to the invention preferably do not contain any titanium oxide, the crystallization tendency is advantageously influenced.

DETAILED DESCRIPTION OF THE PREFERRED EMBODIMENTS

More preferred is a glass comprising (in wt.-%):

| | |
|---|---|
| $SiO_2$ | 35 to 50 |
| $B_2O_3$ | 0.1 to 7 |
| $Al_2O_3$ | 0.1 to 7 |
| $P_2O_5$ | 0.1 to 4 |
| $Li_2O$ | 0 to 6 |
| $Na_2O$ | 2 to 7 |
| $K_2O$ | 2 to 11 |
| MgO | 0 to 5 |
| CaO | 0.5 to 6.5 |
| BaO | 6 to 14.5 |
| ZnO | 14 to 25 |
| $La_2O_3$ | 0 to 5 |
| $ZrO_2$ | 1 to 10 | and possibly refining agents in common amounts.

As refining agents which are commonly added in amounts of less than 1 wt.-%, preferably with a maximum amount of 0.5 wt.-%, e.g. $Sb_2O_3$, $As_2O_3$, SnO, NaCl, $SO_4^{2-}$ and $F^-$ are possible.

Preferred glasses are refined free of arsenic, however, for particular fiber applications of high quality an arsenic refining being good for low attenuation cannot be completely avoided.

The base glass system is a boron aluminosilicate glass system which, by its own, already builds the basis for a good chemical stability, excellent ion-exchange characteristics and high crystallization stability. It is composed by the glass formers $SiO_2$, $B_2O_3$ and $Al_2O_3$ with a total amount of 35.2 to 63 wt.-% (preferably 38.2 to 57 wt.-%, more preferred 40.2 to 57 wt.-%, particularly preferred 38.2 to 55 wt.-%). Herein, $SiO_2$ forms the basis with an amount of 35 to 50 wt.-% (preferably 38 to 47 wt.-%, more preferably 40 to 47 wt.-%, particularly preferred 38 to 45 wt.-%) to which $Al_2O_3$ is added in amounts of 0.1 to 7 wt.-% (preferably 0.1 to 4 wt.-%) and $B_2O_3$ in amounts of 0.1 to 6 wt.-% (preferably 0.1 to 5 wt.-%).

Herein the ratio of the three glass formers resulting from the individual content and the total content of glass formers should preferably be met. Since the content of $Al_2O_3$ is responsible for the increase in the chemical resistance when compared with a pure borosilicate matrix, a minimum content of 0.1 wt.-% (preferably 0.5 wt.-%) is mandatory. However, an increase of the $Al_2O_3$ content beyond 7 wt.-% would lead to an increase of the bulk melting temperature point and thus would lead to an increased manufacturing expenditure and to a corresponding increase in manufacturing cost. Also the length of the glass would increase which would contradict the principles of modern hot forming technologies.

An increase in the total content of glass formers beyond 63 wt.-%, e.g. by increasing the $SiO_2$ content beyond 50 wt.-%, would also have the same negative effect without reaching any advantages with respect to the chemical resistance. A decrease of the $SiO_2$ content below 35 wt.-% would in particular lead to a decrease in crystallization stability of the glasses according to the invention. An elimination of the $Al_2O_3$ content would also lead to a deterioration of ion-exchange characteristics, since an amount within the given limits is at least necessary to expand the silicate structure of the material by means of tube structures caused by $Al_2O_3$, thus providing the conditions for effective diffusion and ion-exchange processes.

This effect is facilitated by the addition of $P_2O_5$ (0.1 to 4 wt.-%, preferably 0.5 to 3 wt.-%), since $Al_2O_3$ is added only in small amounts (due to the increase in melting temperature). Also from $P_2O_5$ it is known that it improves the diffusion characteristics of ions and thereby the ion-exchange characteristics by the generation of tube-like structures in a silicate matrix. However, an increase of $P_2O_5$ beyond the of amount of 4 wt.-% would considerably "soften" too much the chemically resistant and crystallization resistant matrix of the glass so that these positive effects would be lost with increasing amount of $P_2O_5$.

As a third glass former $B_2O_3$ is added in small amounts (0.1 to 6 wt.-%, preferably 0.1 to 5 wt.-%) for reducing the viscosity and the melting point of the glass. An addition beyond the given limits would lead to a further reduction of the viscosity and of the melting point of the glass toward very short glasses or glasses having very low melting points which, with respect to the desired applications in systems with extremely low attenuation, is no alternative to the typical fluxing agents (alkaline metal oxides) and network modifiers (alkaline earth metal oxides), since $B_2O_3$ makes the glasses more aggressive against refractory materials that are used. If melting would take place in silica molds while using significantly increased boron amounts, then the high corrosion would lead to an increased input of silica into the glass and would lead to considerably shorter device lifetimes and thus to higher production cost, apart from a deviation in the glass characteristics. If melting would take place with high boron additions in platinum molds, then the platinum input into the glass caused by the $B_2O_3$ would be that high that the desired excellent attenuation characteristics could not be reached any more (in particular at the blue edge of the spectrum). Also due to the same reason the application of $Li_2O$ is limited to a maximum of 6 wt.-%. In addition, there are synergistic effects between $B_2O_3$ and $Li_2O$ with respect to the aggressiveness of the glasses against refractory materials.

In total, the glasses according to the invention contain between 4 and 24 wt.-% of alkaline metal oxides, however 6 wt.-% of $Li_2O$ at the most. These amounts guarantee good meltability and a low viscosity of the glasses even in view of the necessary high network modifier content mandatory for crystallization stability and chemical stability. An increase in the lithium content would particularly in combination with the boron content increase the aggressiveness against refractory materials in an undesired way. A decrease of the alkaline metal oxide total content would deteriorate the melting characteristics and would also decrease too much the content of ions that are necessary for the ion-exchange so that the requirements with respect to the ion-exchange characteristics and film thickness could not be met on an economical basis. An increase in the alkali metal oxide content beyond 24 wt.-% leads to a decrease in chemical resistance, a deterioration in crystallization stability and to a strong relaxation tendency with respect to a tension building ion-exchange, the classical "prestressing". The individual content of the alkaline metal oxide content preferably comprises 2 to 7 wt.-% (preferably 3 to 6 wt.-%) $Na_2O$, 2 to 11 wt.-% $K_2O$ and optionally up to 6 wt.-% $Li_2O$. This ratio serves to finetune the viscosity-temperature profile. Apart from the disadvantages discussed before, higher amount of $Li_2O$ would also have the problem that the glasses would become too short for suitably controllable hot forming processes. A shifting of the $Na_2O$—$K_2O$-ratio within the given limits may serve to finetune the viscosity. A shifting beyond the limits leaves the viscosity-process ranges (in particular with respect to fiber drawing).

The same holds true with respect to the ratio of the mandatory alkaline earth metal oxides (0 to 12 wt.-%, preferably 0.5 to 6.5 wt.-% CaO, more preferred 1 to 5 wt.-% CaO, particularly preferred 2 to 6.5 wt.-% CaO, as well as BaO at 6 to 14.5 wt.-%, preferably 6 to 12 wt.-%, particularly preferred 8 to 14.5 wt.-%, with an optional replacement of up to 5 wt.-% CaO by MgO (0 to 5 wt.-%)).

These network modifiers do not serve mainly to lower the total viscosity, but to adjust the shortness of the glass which is shortened proportionally to their content. In addition, it must be taken into account that the total amount of MgO+ CaO+SrO is kept considerably below the BaO content, since otherwise diffusion impeding layers could be generated within the initial phase of a potential ion-exchange, this impeding an economical exchange with respect to suitable applications.

If the maximum total amounts of the alkaline earth metal oxide are exceeded, a strong expansion of the stabilized networks results this leading to strong crystallization tendencies and to lower chemical resistance of the glasses.

The small amounts of $ZrO_2$ that are preferably added (up to 10 wt.-%, preferably 1 to 7 wt.-%, more preferred 3 to 7 wt.-%, particularly preferred 2 to 5 wt.-%) and the optional addition of up to 5 wt.-% (preferably up to 3 wt.-%, more preferred up to 1.5 wt.-%) of $La_2O_3$ serve to adjust to the optical position of double-dense crown and barium light flint glasses desired in this regard. They also support the network formers by increasing the chemical resistance of the glasses according to the invention. However, an addition beyond the given maximum limits would lead to losses in transmission (losing the particularly advantageous attenuation characteristics) and to an increased crystallization tendency, since both components have relatively strong self-absorptions.

The nucleating characteristics of $TiO_2$, apart from its strong intrinsic absorption at the blue spectral edge (in particular in combination with Fe-contaminations) is the reason, why the glass is preferably free of $TiO_2$.

Within the glass system described above two homogenous non-overlapping composition regions can be found that both have particularly excellent characteristics. With comparable amounts of $B_2O_3$, $Al_2O_3$, $P_2O_5$, $Na_2O$, $CaO$, $BaO$ and $ZrO_2$ and only slightly changing $SiO_2$ contents (40 to 47 wt.-% and 38 to 45 wt.-%) these two families clearly defer with respect to their contents of $Li_2O$, $K_2O$, $ZnO$ and $La_2O_3$.

The first composition family is subject of claims 5 and 6, while the second composition family is subject of claims 7 and 8.

Using the compositions according to claims 5 and 6, respectively, refractive indices of $1.55 \leq n_d \leq 1.61$ and $1.57 \leq n_d \leq 1.60$, respectively, and Abbe values $50 \leq v_d \leq 55$ and $50 \leq v_d \leq 53$, respectively, can be reached.

Using the compositions according to claims 7 and 8, refractive indices of $1.55 \leq n_d \leq 1.60$ and $1.56 \leq n_d \leq 1.59$, respectively, and Abbe values of $51 \leq v_d \leq 56$ and $51 \leq v_d \leq 54$, respectively, can be reached.

The first one of these families is low on $Li_2O$ or free of $Li_2O$, respectively (0 to 2 wt.-%, preferably no $Li_2O$). To avoid losing the good viscosity characteristics by eliminating this component, this component is replaced by $K_2O$ (>6.5 to 11 wt.-%, preferably >6.5 to 10 wt.-%), the content of which is thereby increased when compared to the family "high" on lithium (Li-content>2 to 6 wt.-%, $K_2O$-content 2 to 6.5 wt.-%, preferably 3 to 6.5 wt.-%). In this way, the two families deviate from each other with respect to their refractory material corrosivity and their crystallization tendency which are both roughly proportional to the $Li_2O$-content, and also defer with respect to their bulk cost which is roughly inversely proportional to the $Li_2O$-content.

In the composition range low on $Li_2O$ or free of $Li_2O$, respectively, also the ZnO-content is considerably increased. Herein preferably 20 to 25 wt.-% are added, while the lithium containing glass family preferably contains only 14<20 wt.-%, preferably 14 to 19 wt.-%, of ZnO. By contrast, the $La_2O_3$-content is lowered (0 to 1.5 wt.-%, when compared to 1.5 to 5 wt.-% in the lithium containing composition range), preferably even being free of $La_2O_3$. These two differences lead to differences of the two glass types meltable within the two composition ranges deferring with respect to their compatibility with common cladding glasses and acid resistance of the core glass.

Due to small/no $Li_2O$- and $La_2O_3$-contents, the embodiment of the glasses according to the invention low on/free of lithium and having increased $K_2O$-contents, and in particular increased ZnO-contents, within the already optimized range of characteristics according to the invention, offers a further reduction in refractory material corrosivity, better attenuation characteristics, a further increased crystallization stability, and a further increase in acid stability when compared to the lithium containing embodiment of the glasses according to the invention. However, this goes at the expense of a considerably enlarged product opening angle $(2\alpha)$ at equal refractive positions, in view of lower bulk cost, while having theoretically the same numerical aperture in combination with the prior art cladding glasses. Presumably, this effect is caused by interface reactions between the core and cladding glass during fiber drawing, which obviously become more positive within the lithium-containing (and thereby ZnO-reduced) variant of the glass according to the invention.

Apart from various other possible applications, the glasses according to the invention can be utilized particularly advantageously as core glass materials for making optical stepped fibers. Such optical stepped fibers at the peripheral wall of the core glass comprise a completely adjoining cladding glass, preferably having a numerical aperture of 0.28 to 0.70.

Herein as a cladding glass matched to the core glass a cladding glass may be utilized comprising (in wt.-%):

| | |
|---|---|
| $SiO_2$ | 60 to 72 |
| $B_2O_3$ | <20 |
| $Na_2O$ | <18 |
| $K_2O$ | <15 |
| $Li_2O$ | <2 |
| MgO | <3 |
| BaO | <3 |
| SrO | <4 |
| CaO | <6 |
| ZnO | <3 |
| F | <1 |
| other oxides | 0 to 3, | wherein the glass may be molten by adding refining agents up to 1 wt.-%.

Herein, apart from any unintended contaminants, no other oxides are added, apart from refining agents in amounts of up to 1 wt.-%, preferably of up to 0.5 wt.-%.

Again, apart from any unintended contaminants, the cladding glass is free of $Cs_2O$.

According to a preferred development of the invention the sum of the components $Na_2O$, $Li_2O$ and $K_2O$ within the cladding glass is smaller than 3 wt.-%. The preferred $SiO_2$-amount of the cladding glass is about 66 to 72 wt.-%.

The invention will now be described in more detail with reference to practical examples.

EXAMPLES

Tables 2 and 3 contain 14 examples within a preferred composition range. The glasses according to the invention were prepared in the following way:

The raw materials for the oxides, preferably carbonates, nitrates and/or fluorides, are weighed out, one or more refining agents, such as $Sb_2O_3$, are added and subsequently thoroughly mixed. The bulk glass is molten at about 1350° C. within a continuous melting plant, is refined thereafter (1400° C.) and homogenized. The glass is cast at a casting temperature of about 1270° C. (or may e.g. be drawn to fiber core rods), is cooled and further processed to the desired products.

The characteristics of the glasses obtained in this way are given in Table 3, example 12. A melting example for obtaining 100 kg of calculated glass is given in table 1.

TABLE 1

| Oxide | Wt.-% | Raw Material | Amount (kg) |
|---|---|---|---|
| $SiO_2$ | 39 | $SiO_2$ | 38.89 |
| $B_2O_3$ | 2 | $H_3BO_3$ | 3.54 |
| $Al_2O_3$ | 2 | $Al(OH)_3$ | 3.07 |
| $P_2O_5$ | 3 | $P_2O_5$ | 2.99 |
| $Li_2O$ | 4 | $Li_2CO_3$ | 9.87 |
| $Na_2O$ | 2 | $Na_2CO_3$ | 3.42 |
| $K_2O$ | 4 | $K_2CO_3$ | 5.88 |
| MgO | 3 | $MgCO_3$ | 6.80 |
| CaO | 3 | $CaCO_3$ | 5.30 |
| BaO | 0.3 | $Ba(NO_3)_2$ | 0.51 |
| BaO | 8.7 | $BaCO_3$ | 11.25 |
| ZnO | 24 | ZnO | 23.93 |
| $La_2O_3$ | 1 | $La_2O_3$ | 1.01 |

TABLE 1-continued

| Oxide | Wt.-% | Raw Material | Amount (kg) |
|---|---|---|---|
| $ZrO_2$ | 4 | $ZrO_2$ | 3.99 |
| $Sb_2O_3$ | 0.3 | $Sb_2O_3$ | 0.30 |
| Sum | 100.3 | | |

For demonstrating the compatibility with common cladding glasses (Table 4) random samples of compositions of the claimed composition range of the core glass were molten, drawn to fibers together with the given common cladding glasses and were examined:

According to the rod-tube-process a cylindrical rod of a highly refractive core glass and the tube of lower refractive cladding glass surrounding same are heated in a cylindrical furnace up to a temperature corresponding to the viscosity of about $10^4$ to $10^3$ dPas. Herein the core and cladding glasses melt together to a so-called drawing onion from which the optical fiber is drawn. The fiber diameter herein depends on the ratio of the fiber drawing speed and the following speed of the rod-tube-system and on the geometry of the core rod and tube. This process requires considerable care to keep the surface of the core rod and the inner surface of the tube extremely clean and free of any debris and particles so that they may melt together to an interface of the fiber as ideal and as free of defects as possible. Also it has been found to be advantageous when the outer diameter of the core rod and the inner diameter of the tube deviate from each other only by a few tenths of millimeters so that an even drawing onion free of faults can emerge.

The required core glass rods of different glass compositions were made as follows: For each selected glass composition a molten glass mass of 4 liters only (due to the small amount of glass needed, arsenic refining facilitating low attenuation) was cast into an ingot mold (about 400 mm×200 mm×50 mm). Out of this, two to three cylindrical rods (about 300 mm long with a diameter of 30 mm) were cut mechanically. In the last processing step the rods were delicately optically polished to fulfill the afore-mentioned requirements with respect to an ideal interface. A total of 10 different core glass types according to the invention were molten and processed to yield core glass rods, in part having the same glass compositions as the given examples, partially also having different compositions.

The cladding glasses necessary for fiber drawing were provided in a suitable tube-shape as mentioned before (inner diameter about 31 mm, outer diameter about 34 mm to 35 mm). The dimensions thereof had a small tolerance (resulting from the drawing of the tubes out of a platinum drawing die), so that no additional mechanical processing was necessary. Merely before the combining to a rod-tube-system, just before the drawing process, the core rod and the tube were carefully cleaned within an ultrasonic bath as known in the art, to provide optimum interfaces during melting within the drawing process.

The fiber drawing was performed utilizing a rod-tube-drawing machine comprising a cylindrical furnace known in the prior art. Only fibers of 70 μm diameter were drawn. This corresponds to a worldwide standard which has been established for multi-component fibers which are almost completely further processed to fiber bundles.

The cladding glass examples 4 and 5 given in Table 4 led to certain problems during the fiber drawing process, due to their increase in viscosity and to their significant length, since the viscosity-temperature-profiles of the glasses according to the invention are matched to yield "short" types, keeping in mind modern primary precision heat-forming processes. This leads to the claimed composition range of cladding glasses according to the invention with respect to the $SiO_2$ content (60 to 72 wt.-%, preferably 66 to 72 wt.-%).

All the numerical apertures measured on cladding glasses 1 to 3 were in the range between 0.28 and 0.70. Naturally, with combinations of somewhat higher refractive core glasses and somewhat lower refractive cladding glasses the higher aperture values were obtained, while combinations of somewhat less refractive core glasses with somewhat higher refractive cladding glasses yielded lower aperture values.

Attenuation was measured using the so-called back-cutting process (DIN 58 141-1). Herein extraordinary good results were obtained for the multi-component glasses being in the range of <1000 dB/km at 452 nm, <500 dB/km at 554 nm and <750 dB/km at 642 nm.

For instance, with the embodiments of the particularly preferred core glass composition ranges values of <750 db/km at 452 nm, <350 dB/km at 554 nm and of <500 dB/km at 642 nm could be reached.

TABLE 2

Melting examples (in wt.-%)

| | Examples | | | | | | |
|---|---|---|---|---|---|---|---|
| | 1 | 2 | 3 | 4 | 5 | 6 | 7 |
| $SiO_2$ | 40 | 43 | 42 | 45 | 45 | 42 | 44 |
| $B_2O_3$ | 3 | 5 | 0.1 | 6 | 4 | 5 | 1 |
| $Al_2O_3$ | 2 | 0.5 | 3 | 4 | 0.1 | 1 | 2 |
| $P_2O_5$ | 1 | 0.5 | 3 | 4 | 0.1 | 3 | 2 |
| $Li_2O$ | 5 | 3 | 5.9 | 5 | 2.3 | | |
| $Na_2O$ | 5 | 3 | 6 | 2 | 7 | 6 | 3 |
| $K_2O$ | 4 | 6.5 | 3 | 2 | 5 | 10 | 7 |
| MgO | | | 1 | | | | |
| CaO | 5 | 3.5 | 1 | 6 | 0.5 | 1 | 5 |
| BaO | 13 | 8 | 14 | 6 | 7 | 7 | 8 |
| ZnO | 17 | 19 | 16 | 14 | 18 | 20 | 25 |
| $La_2O_3$ | 2 | 3 | 3 | 5 | 4 | | |

TABLE 2-continued

Melting examples (in wt.-%)

| | Examples | | | | | | |
|---|---|---|---|---|---|---|---|
| | 1 | 2 | 3 | 4 | 5 | 6 | 7 |
| $ZrO_2$ | 3 | 5 | 2 | 1 | 7 | 5 | 3 |
| $As_2O_3$ | — | 0.3 | — | — | 0.3 | — | — |
| Sum | 100 | 100.3 | 100 | 100 | 100.3 | 100 | 100 |
| $n_d$ | 1.5824 | 1.5845 | 1.5679 | 1.5588 | 1.5838 | 1.5742 | 1.5869 |
| $v_d$ | 52.43 | 52.08 | 53.79 | 55.63 | 51.79 | 52.74 | 51.29 |
| $P_{g,F}$ | 0.5536 | 0.5476 | 0.5546 | 0.5436 | 0.5476 | 0.5526 | 0.5536 |
| $\Delta P_{g,F}(10^{-4})$ | −20 | −90 | 10 | −70 | −90 | −30 | −40 |
| $\rho$ (g/cm$^3$) | 10.2 | 8.4 | 11.0 | 7.9 | 8.9 | 9.3 | 7.7 |
| Tg (° C.) | 443 | 503 | 427 | 429 | 509 | 534 | 561 |
| $\alpha_{20-300}$ ($10^{-6} * K^{-1}$) | 3.09 | 3.06 | 3.08 | 2.80 | 3.10 | 3.00 | 3.11 |

TABLE 3

Melting examples (wt.-%)

| | Examples | | | | | | |
|---|---|---|---|---|---|---|---|
| | 8 | 9 | 10 | 11 | 12 | 13 | 14 |
| $SiO_2$ | 47 | 40 | 41 | 38 | 39 | 35 | 50 |
| $B_2O_3$ | 0.1 | 5 | 6 | 0.2 | 2 | 3 | 1 |
| $Al_2O_3$ | 0.1 | 3 | 0.5 | 0.4 | 2 | 7 | 1 |
| $P_2O_5$ | 0.5 | 4 | 0.5 | 0.4 | 3 | 2 | 0.1 |
| $Li_2O$ | | 2 | 0.5 | 1 | 4 | 6 | 3 |
| $Na_2O$ | 3.3 | 2 | 7 | 4 | 2 | 4 | 2 |
| $K_2O$ | 7 | 7 | 11 | 9 | 4 | 2 | 2 |
| MgO | | | | | 3 | | |
| CaO | 1 | 0.5 | 4 | 6.5 | 3 | 2 | 1 |
| BaO | 12 | 14 | 6 | 14.5 | 9 | 6 | 9.9 |
| ZnO | 22 | 20 | 21 | 21 | 24 | 22 | 23 |
| $La_2O_3$ | | 0.5 | 1.5 | 2 | 1 | 1 | 5 |
| $ZrO_2$ | 7 | 2 | 1 | 3 | 4 | 10 | 2 |
| $As_2O_3$ | — | 0.3 | — | — | 0.3 | — | — |
| Sum | 100 | 100.3 | 100 | 100 | 100.3 | 100 | 100 |
| $n_d$ | 1.5981 | 1.5617 | 1.5592 | 1.6003 | 1.5948 | 1.6102 | 1.5739 |
| $v_d$ | 50.13 | 54.42 | 54.23 | 49.7 | 50.91 | 49.76 | 53.03 |
| $P_{g,F}$ | 0.5506 | 0.5476 | 0.5556 | 0.5596 | 0.5516 | 0.5556 | 0.5446 |
| $\Delta P_{g,F}(10^{-4})$ | −100 | −50 | 20 | −10 | −70 | −50 | −110 |
| $\rho$ (g/cm$^3$) | 7.8 | 8.5 | 9.9 | 9.4 | 8.6 | 8.9 | 7.0 |
| Tg (° C.) | 604 | 531 | 486 | 533 | 491 | 456 | 541 |
| $\alpha_{20-300}$ ($10^{-6} * K^{-1}$) | 3.24 | 3.09 | 2.91 | 3.26 | 3.17 | 3.15 | 3.15 |

TABLE 4

Cladding glass embodiments

| | Composition (wt.-%) | | | | |
|---|---|---|---|---|---|
| Example No. | 1 | 2 | 3 | 4 | 5 |
| $SiO_2$ | 69 | 70 | 68 | 81 | 75 |
| $B_2O_3$ | 19 | 1 | 3 | 12 | 10 |
| $Al_2O_3$ | 3 | 4 | 8 | 2.5 | 5 |
| $Na_2O$ | 1 | 13 | 15 | 3.5 | 7 |
| $K_2O$ | 8 | 2.3 | | 1 | 0.1 |
| $Li_2O$ | | | 1 | | |
| MgO | | 2.5 | | | |
| BaO | | 2 | | | 0.6 |
| CaO | | 5 | 3 | | 1.4 |
| ZnO | | | | 1.5 | |
| F | | 0.2 | 0.5 | | 0.2 |

What is claimed is:

1. A boron aluminosilicate glass comprising at least the following components (in wt.-%):

| $SiO_2$ | 40 to 47 |
|---|---|
| $B_2O_3$ | 0.1 to 6 |
| $Al_2O_3$ | 0.1 to 4 |
| $P_2O_5$ | 0.1 to 4 |
| $Li_2O$ | 0 to 2 |
| $Na_2O$ | 2 to 7 |
| $K_2O$ | >6.5 to 11 |
| MgO | 0 to 5 |
| CaO | 0. to 6 |
| BaO | 6 to 14 |
| ZnO | 20 to 25 |
| $La_2O_3$ | 0 to 1.5 |
| $ZrO_2$ | 1 to 7. | wherein said glass is free of lead, and
wherein said glass is an optical glass.

2. The boron aluminosilicate of claim 1 comprising (in wt.-%):

| | |
|---|---|
| SiO$_2$ | 42 to 47 |
| B$_2$O$_3$ | 0.1 to 5 |
| Al$_2$O$_3$ | 0.1 to 2 |
| P$_2$O$_5$ | 0.5 to 3 |
| Na$_2$O | 3 to 6 |
| K$_2$O | >6.5 to 10 |
| CaO | 1 to 5 |
| BaO | 6 to 12 |
| ZnO | 20 to 25 |
| ZrO$_2$ | 3 to 7, | to 1 wt.-% of refining agents.

3. The boron aluminosilicate glass of claim 1, wherein said glass is an optical glass having a retractive index n$_d$ between 1.54 and 1.62.

4. The boron aluminosilicate glass of claim 1, wherein said glass is an optical glass having an Abbe number between 48 and 57.

5. The boron aluminosilicate glass of claim 1, wherein said glass is an optical glass having a refractive index n$_d$ between 1.54 and 1.62 and an Abbe number between 48 and 57.

6. A boron aluminosilicate glass comprising at least the following components (in wt.-%):

| | |
|---|---|
| SiO$_2$ | 38 to 45 |
| B$_2$O$_3$ | 0.1 to 6 |
| Al$_2$O$_3$ | 0.1 to 4 |
| P$_2$O$_5$ | 0.1 to 4 |
| Li$_2$O | >2 to 6 |
| Na$_2$O | 2 to 7 |
| K$_2$O | 2 to 6.5 |
| MgO | 0 to 5 |
| CaO | 0.5 to 6.5 |
| BaO | 6 to 14.5 |
| ZnO | 14 to <20 |
| La$_2$O$_3$ | >1.5 to 5 |
| ZrO$_2$ | 1 to 7; | wherein said glass is an optical glass that is free of lead.

7. The boron aluminosilicate of claim 6, comprising the following components (in wt.-%):

| | |
|---|---|
| SiO$_2$ | 38 to 43 |
| B$_2$O$_3$ | 0.1 to 5 |
| Al$_2$O$_3$ | 0.5 to 3 |
| P$_2$O$_5$ | 0.5 to 3 |
| Li$_2$O | >2 to 6 |
| Na$_2$O | 3 to 6 |
| K$_2$O | 3 to 6.5 |
| CaO | 2 to 6.5 |
| BaO | 8 to 14.5 |
| ZnO | 14 to 19 |
| La$_2$O$_3$ | >1.5 to 3 |
| ZrO$_2$ | 2 to 5, | up to 1 wt.-% of refining agents.

8. A boron aluminosilicate glass comprising (in wt.-%):

| | |
|---|---|
| SiO$_2$ | 35 to 50 |
| B$_2$O$_3$ | 0.1 to 7 |
| Al$_2$O$_3$ | 0.1 to 7 |
| P$_2$O$_5$ | 0.1 to 4 |
| R$_2$O | 4 to 24 |
| RO | 0 to 12 |
| BaO | 6 to 14.5 |
| ZnO | 14 to 25 |
| La$_2$O$_3$ | 0 to 5 |
| ZrO$_2$ | 0 to 10, | wherein R$_2$O is an alkali oxide, RO is an alkaline earth oxide apart from BaO, wherein the amount of Li$_2$O is 6 wt.-% maximum and wherein the glass, apart any unintended contaminants, does not contain any GeO$_2$, SnO$_2$, AgO or any rare earth metals and wherein said glass is an optical glass that is free of lead.

9. The boron aluminosilicate of claim 8 which comprises up to 1 wt.-% of refining agents.

10. The boron aluminosilicate glass of claim 9 wherein said refining agents comprise at least one component selected from the group formed by Sb$_2$O$_3$, As$_2$O$_3$, SnO, NaCl, So$_4^{2-}$ and F$^-$.

11. The boron aluminosilicate glass of claim 10, wherein the portion of RO in the total weight is smaller than the portion of BaO.

12. The boron aluminosilicate glass of claim 8 comprising (in wt.-%):

| | |
|---|---|
| SiO$_2$ | 35 to 50 |
| B$_2$O$_3$ | 0.1 to 7 |
| Al$_2$O$_3$ | 0.1 to 7 |
| P$_2$O$_5$ | 0.1 to 4 |
| Li$_2$O | 0 to 6 |
| Na$_2$O | 2 to 7 |
| K$_2$O | 2 to 11 |
| MgO | 0 to 5 |
| CaO | 0.5 to 6.5 |
| BaO | 6 to 14.5 |
| ZnO | 14 to 25 |
| La$_2$O$_3$ | 0 to 5 |
| ZrO$_2$ | 1 to 10 | refining agents in common amounts.

13. The boron aluminosilicate glass of claim 8, comprising at least the following components (in wt.-%):

| | |
|---|---|
| SiO$_2$ | 38 to 47 |
| B$_2$O$_3$ | 0.1 to 6 |
| Al$_2$O$_3$ | 0.1 to 4 |
| P$_2$O$_5$ | 0.1 to 4 |
| Li$_2$O | 0 to 6 |
| Na$_2$O | 2 to 7 |
| K$_2$O | 2 to 11 |
| MgO | 0 to 5 |
| CaO | 0.5 to 6.5 |
| BaO | 6 to 14.5 |
| ZnO | 14 to 25 |
| La$_2$O$_3$ | 0 to 5 |
| ZrO$_2$ | 1 to 7. |

14. The boron aluminosilicate glass of claim 8 having a refractive index n$_d$ of $154 \leq n_d \leq 162$.

15. The boron aluminosilicate glass of claim 8 having an Abbe number of $48 \leq v_d \leq 57$.

16. A boron aluminosilicate glass comprising (in wt.-%):

| | |
|---|---|
| $SiO_2$ | 35 to 50 |
| $B_2O_3$ | 0.1 to 7 |
| $Al_2O_3$ | 0.1 to 7 |
| $P_2O_5$ | 0.1 to 4 |
| $R_2O$ | 4 to 24 |
| RO | 0 to 12 |
| BaO | 6 to 14.5 |
| ZnO | 14 to 25 |
| $La_2O_3$ | 0 to 5 |
| $ZrO_2$ | 0 to 10, | wherein $R_2O$ is an alkali oxide, RO is an alkaline earth oxide apart from BaO, wherein the amount $Li_2O$ is 6 wt.-% maximum, wherein said glass is free or lead, and wherein said glass is an optical class.

17. The boron aluminosilicate glass of claim 16, wherein said glass comprises 4 to 12 wt.-% of $K_2O$.

18. The boron aluminosilicate glass of claim 16, wherein said glass is an optical glass having a refractive index $n_d$ between 1.54 and 1.62

19. The boron aluminosilicate class of claim 16, wherein said glass is an optical glass having an Abbe number between 48 and 57.

20. The boron aluminosilicate glass of claim 16, wherein said glass is an optical glass having a refractive index $n_d$ between 1.54 and 1.62 and an Abbe number between 48 and 57.

21. The boron aluminosilicate glass of claim 20, wherein said class comprises 4 to 12 wt.-% of $K_2O$.

* * * * *

UNITED STATES PATENT AND TRADEMARK OFFICE
CERTIFICATE OF CORRECTION

PATENT NO.          : 7,323,427 B2
APPLICATION NO. : 10/789926
DATED                   : January 29, 2008
INVENTOR(S)         : Silke Wolff et al.

It is certified that error appears in the above-identified patent and that said Letters Patent is hereby corrected as shown below:

Title Page Item [75] Inventors,
Line 4, "Mainz-Budenheim" should be -- Mainz --.

Column 14,
Line 63, "." should be -- , --.

Column 15,
Line 1, after "aluminosilicate" insert -- glass --.
Line 15, before "to" insert -- up --.
Line 17, "retractive" should be -- refractive --.
Line 44, after "aluminosilicate" insert -- glass --.
Line 60, "wt,-%" should be -- wt.-% --.

Column 16,
Line 13, after "apart" insert -- from --.
Line 18, after "aluminosilicate" insert -- glass --.

Column 17,
Line 15, after "amount" insert -- of --.
Line 17, "or" should be -- of --.

UNITED STATES PATENT AND TRADEMARK OFFICE
CERTIFICATE OF CORRECTION

PATENT NO. : 7,323,427 B2
APPLICATION NO. : 10/789926
DATED : January 29, 2008
INVENTOR(S) : Silke Wolff et al.

It is certified that error appears in the above-identified patent and that said Letters Patent is hereby corrected as shown below:

Column 18,
Line 1, "class" should be -- glass --.
Line 6, after "1.62" insert -- . --.
Line 7, "class" should be -- glass --.
Line 15, "class" should be -- glass --.

Signed and Sealed this

Twenty-sixth Day of May, 2009

JOHN DOLL
*Acting Director of the United States Patent and Trademark Office*